United States Patent [19]
Saito et al.

[11] Patent Number: 5,337,378
[45] Date of Patent: Aug. 9, 1994

[54] OPTICAL FIBER SWITCH INCLUDING PARTITIONS FOR RESTRICTING SURPLUS FIBERS

[75] Inventors: Kazuhito Saito, Yokohama; Hideo Kobayashi; Toshiaki Katagiri, both of Mito, all of Japan

[73] Assignees: Sumitomo Electric Industries, Ltd., Osaka; Nippon Telegraph and Telephone Corp., Tokyo, both of Japan

[21] Appl. No.: 50,773

[22] Filed: Apr. 22, 1993

[30] Foreign Application Priority Data

Apr. 23, 1992 [JP] Japan .................. 4-104605

[51] Int. Cl.⁵ .................. G02B 6/26; G02B 6/28
[52] U.S. Cl. .................. 385/16; 385/15; 385/22; 385/25; 385/136; 385/137
[58] Field of Search .......... 385/16, 15, 17, 24, 385/19, 18, 20, 25, 135, 136, 137, 22, 23

[56] References Cited

U.S. PATENT DOCUMENTS

| | | | |
|---|---|---|---|
| 4,239,331 | 12/1980 | Aoyama | 385/16 X |
| 4,365,863 | 12/1982 | Broussaud | 385/17 |
| 4,911,520 | 3/1990 | Lee | 385/16 X |
| 4,946,247 | 8/1990 | Muska et al. | 385/16 X |
| 4,955,686 | 9/1990 | Buhrer et al. | 385/17 |
| 5,031,994 | 7/1991 | Emmons | 385/16 X |
| 5,033,813 | 7/1991 | Westfall | 385/16 X |
| 5,073,001 | 12/1991 | Sato et al. | 385/19 |
| 5,098,207 | 3/1992 | Blomgren | 385/16 |
| 5,175,776 | 12/1992 | Lee | 385/16 |
| 5,177,804 | 1/1993 | Shimizu et al. | 385/20 |
| 5,201,016 | 4/1993 | Jinbo et al. | 385/19 |
| 5,268,975 | 12/1993 | Yoshitani et al. | 385/22 |

FOREIGN PATENT DOCUMENTS

| | | | |
|---|---|---|---|
| 0323920 | 7/1989 | European Pat. Off. | |
| 0150810 | 6/1990 | Japan | 385/17 |
| 3287212 | 12/1991 | Japan | |
| 3287213 | 12/1991 | Japan | |

OTHER PUBLICATIONS

Katagiri et al, "Cassette-Type Non-Blocking 100×100 Optomechanical Matrix Switch", IEICE Transactions on Communications, vol. E75-B, No. 12, Dec. 1992, pp. 1373–1375.

Katagiri et al., "Nonblocking 100×100 Optomechanical Matrix Switch for Subscriber Networks", International Wire and Cable Symposium Proceedings 1991, pp. 285–290.

Primary Examiner—Brian Healy
Attorney, Agent, or Firm—Cushman, Darby & Cushman

[57] ABSTRACT

An optical matrix switch includes a first guide mechanism having plural guide portions arranged in parallel, a first slider for holding an optical fiber, the first slider being freely slidably mounted along a guide portion of the first guide mechanism, a first partition member for isolating a surplus-length portion of the optical fiber along the guide portion of the first guide mechanism the optical fiber being connected to the first slider, and first drive means for moving the first slider along the guide portion of the first guide mechanism.

20 Claims, 3 Drawing Sheets

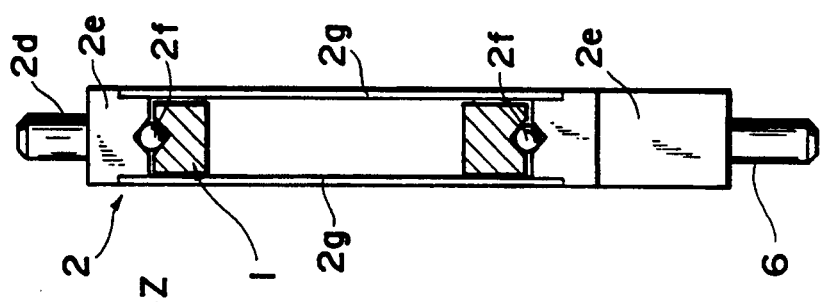
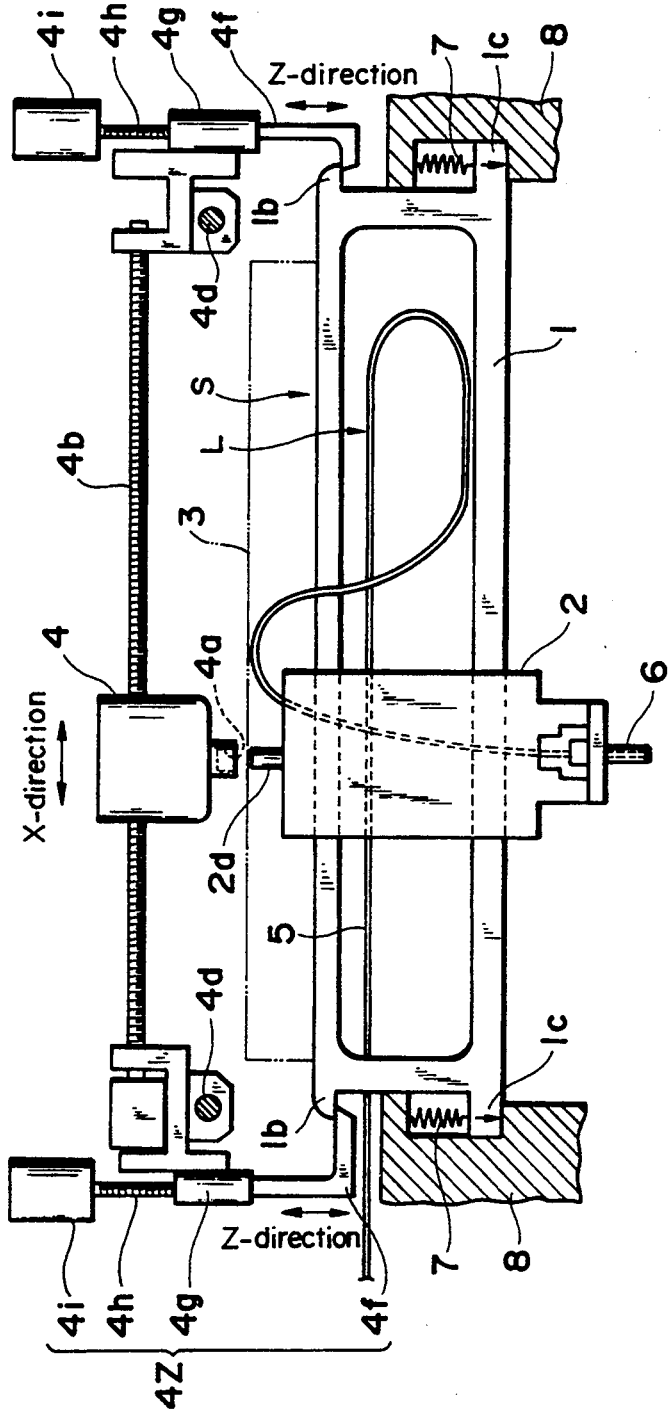

OPTICAL FIBER SWITCH INCLUDING PARTITIONS FOR RESTRICTING SURPLUS FIBERS

BACKGROUND OF THE INVENTION

1. Field of the Invention

This invention relates to an optical matrix switch suitable for a subscriber network through which one optical fiber of an optical fiber group arranged in a plane-form (in a matrix form) is connected and disconnected to another optical fiber of an optical fiber group arranged in a plane-form.

2. Related Background Art

At present, an optical fiber communication system has been propagated to be introduced into a trunk or mainline system, and this communication system requires a new subscriber network using a large number of optical fibers arranged in a substantially plane form, which is different from a conventional network for a point-to-point relay transmission.

A conventional optical matrix switch has been known to have a construction that a number of guide rails are arranged at right angles to one another so as to be confronted to one another, optical fibers are fixed to slide terminals which are slidably movable on the respective guide rails, and the slide terminals are moved to connect any optical fibers to each other ("NONBLOCKING 100×100 OPTOMECHANICAL MATRIX SWITCH FOR SUBSCRIBER NETWORKS" by Toshiaki KATAGIRI, Yahei KOYAMADA, Masao TACHIKURA and Yutaka KATSUYAMA, International Wire & Cable Symposium Proceedings 1991, pp. 285–289). This optical matrix switch is so designed that a surplus length of an optical fiber to be supplied to the slide terminal is treated by a fiber-accumulator(surplus-length treating mechanism) disposed at the outside.

The fiber-accumulator has a pair of reels which are disposed on the same plane inside of the fiber-accumulator and urged by a spring in such a direction that these reels are away from each other, and the optical fiber is wound around these reels to thereby perform a surplus-length treatment of the optical fiber.

In the conventional optical matrix switch, the fiber-accumulator is equipped as a separate equipment at the outside of the main body of the optical matrix switch, and thus the whole construction of the device is large in size.

SUMMARY OF THE INVENTION

An object of this invention is to provide an optical matrix switch which can be designed in compact size and has high reliability.

In order to attain the above object, the optical matrix switch according to this invention has a first guide mechanism, a first slider, a first partition member, and first driving means.

The first guide mechanism includes plural guide portions arranged in parallel, and the first slider, which is freely slidably mounted along a guide portion of the first guide mechanism, serves to hold an optical fiber. The first partition member serves to isolate a surplus-length portion of the optical fiber connected to the first slider along the guide portion of the first guide mechanism, and the first driving means serves to move the first slider along the guide portions of the first guide mechanism.

According to the optical matrix switch of this invention thus constructed, the surplus-length portion of the optical fiber is disposed between the guide portion and the partition member, and allowed to sag and extend in a restricted space by movement of the slider.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIG. 3A is a longitudinal-sectional view of the optical matrix switch which is taken on a X-Z plane along guide portions; and FIG. 3B is a longitudinal-sectional view of a slide terminal of the optical matrix switch.

DESCRIPTION OF THE PREFERRED EMBODIMENT

Figure 1A:
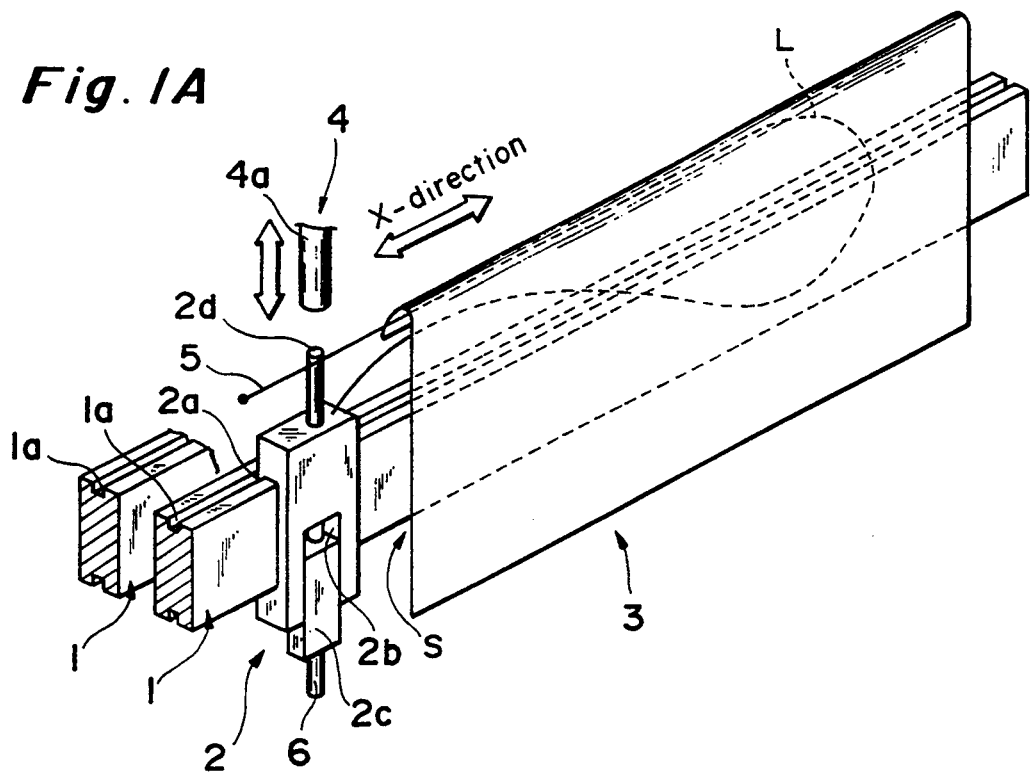
FIG. 1A is a perspective view of the basic construction of an optical matrix switch of an embodiment according to this invention.

An embodiment of this invention will be described hereunder with reference to the accompanying drawings. In the following description, the same elements are represented by the same reference numerals, and duplicate description is eliminated.

Figure 1B:
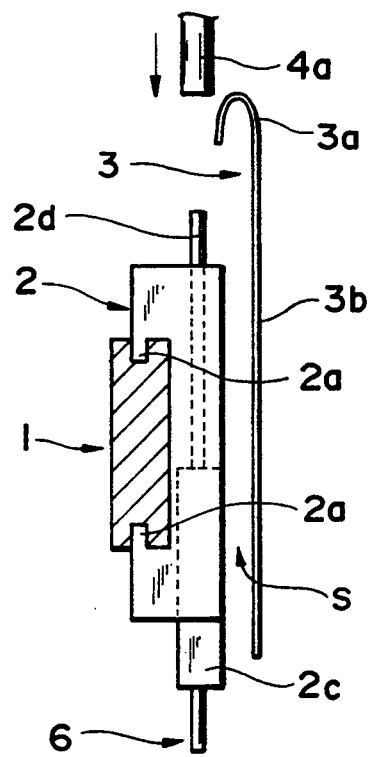
FIG. 1B is a cross sectional view of the optical matrix switch as shown in FIG. 1A.

First, an optical matrix switch according to a first embodiment of this invention will be described with reference to FIGS. 1A and 1B.

The optical matrix switch includes a guide rail 1 serving as a guide mechanism, a slide terminal 2 serving as a slider, a partition plate 3 serving as a partition member which is bent in J-shaped, and a robot hand 4 serving as drive means.

The guide rail 1 is designed in a slender rectangular shape, and a rectangular guide groove 1a is formed on each of the upper and lower surfaces thereof in a guide direction, that is, in an X-direction. The slide terminal 2 is engaged with these guide grooves 1a, and slidable along the guide rail 1.

Therefore, the slider terminal 2 is concavely designed in section, and engaging portions 2a are projected from both side surfaces of the recess of the slide terminal 2 so as to be engaged with the guide grooves 1a, so that the slide terminal 2 is stably held by the guide rail 1. A rectangular groove 2b is formed at a side surface of the slide terminal 2, and a rectangular member 2c is engaged with the rectangular groove 2b. A ferrule 6 holding an optical fiber 5 is fixed inside of the rectangular member 2c, and a pin 2d which is grasped by the robot hand 4 is projected from the upper portion of the slide terminal 2. The optical fiber 5 is drawn out from a side portion of the pin 2d to form a loop L of the optical fiber 5 along the guide rail 1.

Next, the positional relationship between the guide rail 1, the slide terminal Z, the partition plate 3 and the robot hand 4 will be described with reference to FIG. 1B. The partition plate 1 includes a bent portion 3a which is bent at a constant radius of curvature, and a fiber holding portion 3b in which a loop L of an optical fiber is held. A space S in which the optical fiber is subjected to a surplus-length treatment is defined by the fiber holding portion 3b and the side surface of the guide rail 1. The hand portion 4a is approached to the pin 2d in a direction vertical to the guide groove to access the pin 2d. Therefore, the bent portion 3a of the partition plate 3 is disposed outside of a passageway of the hand portion 4a. However, the bent portion 3a is formed by bending it at a constant curvature radius, so that the partition plate 3 may be slightly inclined to the slide terminal 2 or disposed nearer to the slide terminal 2. Therefore, even when the hand portion 4a is contacted with the bent portion 3a, the impact force of the hand portion 4a is absorbed by elasticity of the partition plate 3, and thus it never obstructs the access of the hand portion 4a to the pin 2d when the hand portion 4a is descended. A groove into which the pin 2d is inserted is formed at the end portion of the hand portion 4a, and is movable at least in upward and downward directions and the X-direction. Therefore, the robot hand 4 is descended to insert the pin 2d into the groove, and then is moved in the X-direction, whereby the slide terminal 2 is moved along the guide rail 1.

The partition plate 3 is disposed between a pair of guide rails 1 therealong, and a space S is assured between the partition plate 3 and the guide rail 1. The loop L of the optical fiber 5 is accommodated in the space S. An optical fiber guided from the ferrule 6 of the slide terminal 2 is accommodated in this space S, and the fiber length is kept to such a value that it is not locally bent even when the slide terminal 2 is moved to any position in right and left directions.

Upon the movement of the robot hand 4 in engagement with the slide terminal 2 in the X-direction, the radius of curvature of the loop L of the optical fiber 5 is varied. However, the upper end portion of the optical fiber 5 is engaged with the bent portion of the partition plate 3 at all times due to the rigidity of the optical fiber 5, so that the optical fiber 5 is held so as be accommodated in the space S at all times.

Figure 2:
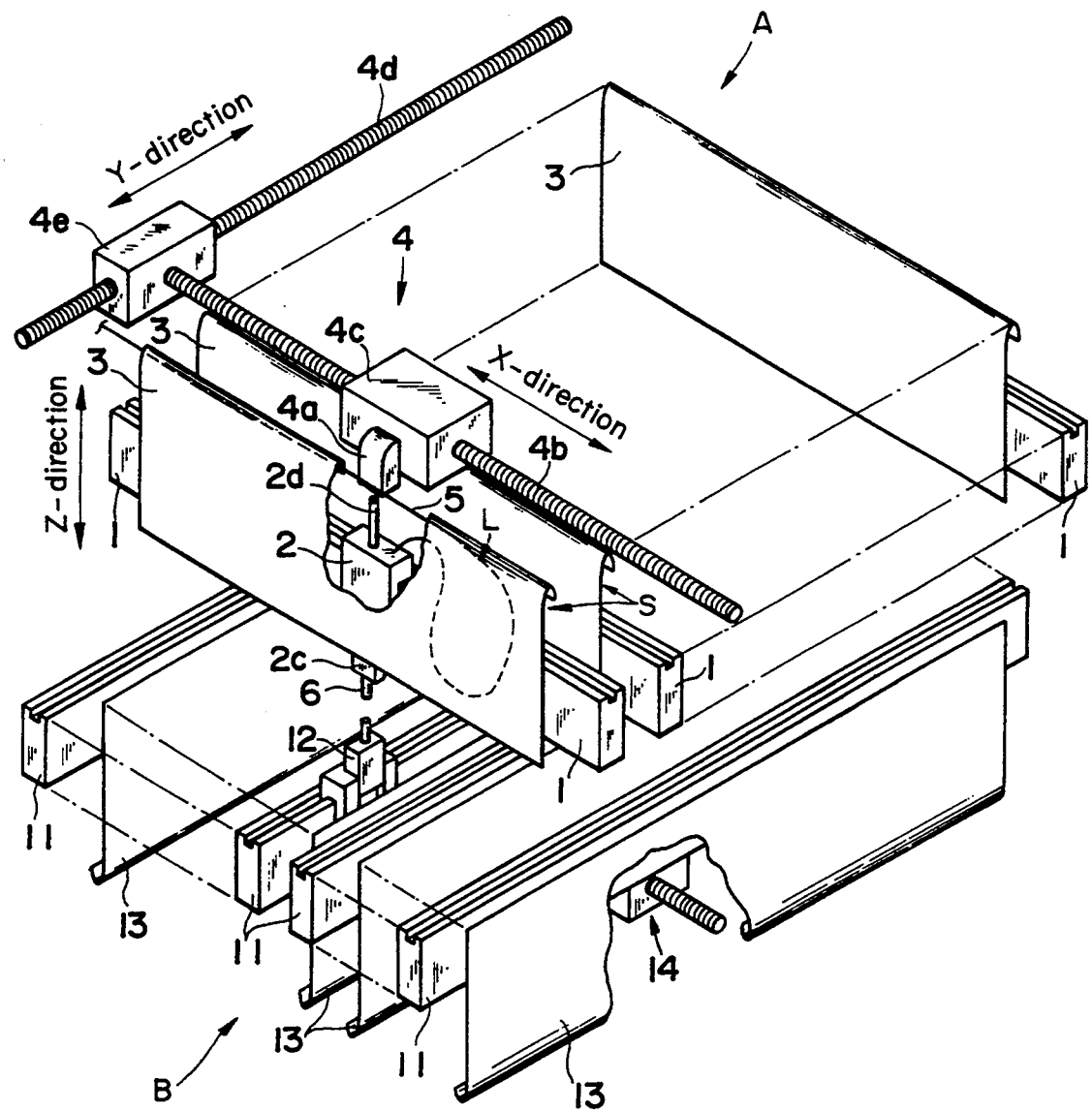
FIG. 2 is a perspective view of the whole construction of the optical matrix switch to which the basic construction of FIG. 1 is applied.

Next, an optical matrix switch according to a second embodiment of this invention will be described with reference to FIG. 2. This optical matrix switch is applicable to an optical switch of 100-inputs × 100-output scale. The optical matrix switch of this embodiment includes a first matrix portion A comprising a number of guide rails 1 arranged in the Y-direction, and a second matrix portion B comprising a number of guide rails 11 which are arranged in the X-direction so as to be confronted to the first matrix portion A.

In the first matrix portion A, the slide terminal 2 is mounted on each of the guide rails 1, and the slide terminal 2 is driven by the robot hand 4. The robot hand 4 has a hand portion 4a for grasping the slide terminal 2, a ball thread 4b extending in the X-direction, a drive portion 4c for driving the hand portion 4a in the X-direction along the ball thread 4b, a ball thread 4d extending in the Y-direction, and a drive portion 4e for driving the hand portion 4a in the Y-direction along the ball thread 4d.

Likewise, in the second matrix portion B, the slide terminal 12 is mounted on each of the guide rails 11 and it is driven by the robot hand 14.

A ferrule 6 is projected at the opposite side to the pin 2d of the slide terminal 2, and the slide terminal 12 has substantially the same construction except the attachment of a split sleeve. This split sleeve is usually made of phosphor bronze or zirconia and is beforehand adhesively fixed to the tip of the ferrule projected at the upper portion of the slide terminal 12. Therefore, the optical fibers which are held by the slide terminals 2 and 12 respectively are easily optically connected to each other. As this type of construction is incorporated by reference as disclosed by Toshiaki KATAGIRI, Yahei KOYAMADA, Masao TACHIKURA and Yataka KATSUYAMA :"NONBLOCKING 100×100 OPTOMECHANICAL MATRIX SWITCH FOR SUBSCRIBER NETWORKS", International Wire & Cable symposium Proceedings, pp. 258–289.

Next, an optical matrix switch according to a third embodiment of this invention will be described with reference to FIGS. 3A and 3B. This embodiment is different from the embodiment as described above in the point that a slide terminal using a ball bearing is used. This slide terminal 2 includes a pair of engaging members 2e, a pair of ball bearing 2f each of which is disposed between the guide rail 1 and the engaging member 2e, a pair of side plates 2g for supporting the pair of engaging members 2e, and a ferrule 6 projected from the engaging member 2e at the lower portion of the slide terminal 2. In this slide terminal 2 thus constructed, the ball guide (bearing) is sandwiched at the contact portion between the guide rail 1 and the slide terminal 2 to thereby reduce slide resistance and prevent the slide terminal 2 from being wrenched and inclined due to parallel movement of the slide terminal 2. Therefore, a load imposed on the driving mechanism 4 is reduced.

Driving means 4Z for driving the guide rails 1 in the Z-direction is provided at both end portions of the guide rails 1. The driving means 4Z comprises an L-shaped guide frame 4f for supporting the upper end portion 1b of the guide rail 1, a nut 4g fixed to the guide frame 4f, a ball thread 4h which is threadably mounted to the nut 4g and guides the guide frame 4f in the Z-direction, and a servo motor 4i for rotating the ball thread 4h. A compression coil spring 7 is mounted at the lower end portion 1c of the guide rail 1, and urges the guide rail 1 downwardly against a fixed base 8.

Therefore, upon the rotation of the ball thread 4h by the servo motor 4i, the guide frame 4f is moved in the Z-direction. As a result, the guide rail 1 is upwardly and downwardly moved, and the slide terminal 2 is moved in the Z-direction. For example in a case where the guide rail 1 is upwardly moved, the guide rail 1 is moved against the compression coil spring 7. When the guide frame 4f is downwardly moved to be away from the upper end portion 1b of the guide rail 1, the guide rail 1 is pushed against the fixed base 8 by the compression coil spring 7.

Since the ball threads 4b and 4d as described above are fixed to the guide portion 4g, the slide terminal 6 can be connected to any slide terminal 12 arranged in the other matrix portion B by adjusting driving amounts of the servo motor 4i and the drive portions 4c and 4e.

The optical fiber 5 is held by the ferrule 6, and a surplus-length portion of the optical fiber 5 is accommodated in the space S which is isolated by the partition plate 3 interposed between the guide rails 1. The upper end portion of the optical fiber 5 is contacted with the inner side of the partition plate 3 due to its rigidity, so that the loops L of the respective optical fibers 5 are arranged along the guide rails i and thus the surplus portions of the optical fibers 5 are prevented from being entangled.

The operation of the slide terminal of the above embodiment will be hereunder described. First, the robot hand 4 for driving the slide terminal 2 is moved, and then stopped above a desired slide terminal 2. This motion is carried out by a ball thread 4b which is rotated by a DC servo motor or the like, and accuracy within ±50 μm can be obtained for a stop position. At this time, the guide frame 4f is simultaneously moved upwardly, and the pin 2d is inserted into a recessed portion of the hand portion 4a. Through the ascending motion of the slide terminal 2, the ferrule 6 projected from the lower portion of the slide terminal 2 releases its joint state. Therefore, the slide terminal 2 is kept to a state where no obstruction occurs to the motion of the slide terminal 2 in the X-direction. Thereafter, the slide terminal 2 is moved to a predetermined position along the X-direction by the robot hand 4. After the slide terminal 2 is moved to the predetermined position, the servo motor 4i is driven to descend the guide rail 1. This descending motion is carried out by a spring force of a compression coil spring 7 which acts on both ends of the guide frame 4f. Through the descending motion of the guide rail 1, the ferrule 6 is jointed to a ferrule at the corresponding other side (not shown). After the guide rail 1 is completely descended, a joint force acting across both ferrules is kept by a coil spring built in the slide terminal. Further, through the descending motion of the slide terminal 2, the pin 2d and the hand portion 4a are naturally released. In the above embodiment, a zirconia ferrule of 2 mm diameter and a hermetic coat fiber having great strength are used as a ferrule and an optical fiber respectively, the height of the accommodating space for the surplus-length portion which is formed between the guide rail 1 and the partition plate 3 is set to 32 mm, and a bending diameter of the fiber is set to about 30 mm. Therefore, there hardly occurs increase in loss or damage due to the bending of the fiber in the accommodating space for the surplus-length portion.

As described above, according to the optical matrix switch of this embodiment, the surplus portions of the optical fibers are orderly arranged, so that a fiber-accumulator is not required and the device construction can be miniaturized.

This invention is not limited to the above embodiment, and various modifications and improvements may be made to the shape, mechanism and arrangement of the guide portion, the slider, the partition member and the drive means without departing from the subject matter of this invention.

According to the optical matrix switch, the surplus portion of the optical fiber is accommodated in the space formed between the guide portion and the partition member. Therefore, the optical fibers can be prevented from being entangled, and a fiber-accumulator is not provided as a separate equipment, so that the whole device construction can be miniaturized.

In addition, no special tension acts on the optical fibers, and thus reliability thereto is stabilized.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical matrix switch comprising:
   a first guide mechanism having plural guide portions arranged in parallel;
   a first slider for holding an optical fiber, said first slider being freely slidably mounted along a guide portion of said first guide mechanism;
   a first partition member for isolating a surplus-length portion of the optical fiber along the guide portion of said first guide mechanism, said optical fiber being connected to said first slider;
   first drive means for moving said first slider along the guide portion of said first guide mechanism;
   a second guide mechanism having plural guide portions arranged in parallel so as to be intersected to the guide portions of said first guide mechanism;
   a second slider for holding an optical fiber, said second slider being freely slidably mounted along a guide portion of said second guide mechanism;
   a second partition member for isolating a surplus-length portion of the optical fiber along the guide portion of said second guide mechanism, said optical fiber being connected to said second slider; and
   second drive means for moving said second slider along the guide portion of said second guide mechanism;
   wherein each of said first and second partition members comprises a plate member having J-shaped section, said J-shaped section including a bent portion and a restriction portion for restricting the position of the surplus-length portion of the optical fiber.

2. The optical matrix switch as claimed in claim 1, wherein each of said guide portions has a guide groove at each of upper and lower portions thereof, and each of said first and second sliders has a pair of engaging portions each of which is engageable with said guide groove.

3. The optical matrix switch as claimed in claim 2, wherein each of said first and second partition members is disposed in such a manner that a concave portion of said bent portion thereof is confronted to said guide groove of said guide portion.

4. The optical matrix switch as claimed in claim 3, wherein each of said first and second sliders holds the optical fiber in a vertical direction to said guide groove, and each of said first and second partition members is disposed such that said guide portion and said bent portion are spaced at an interval to prevent at least the optical fiber from being bent by such an amount that curvature radius thereof is smaller than the minimum critical curvature radius thereof.

5. The optical matrix switch as claimed in claim 4, wherein an accommodating space is formed by said partition member and said guide portion, and the optical fiber is supported in the accommodating space with holding a loop having curvature radius above the minimum critical curvature radius.

6. The optical matrix switch as claimed in claim 5, wherein each of said first and second sliders has a pin projected therefrom, and each of said first and second drive means has a robot hand to which a split sleeve for holding said pin is fixed.

7. The optical matrix switch as claimed in claim 6, wherein a ferrule for holding the optical fiber is projected at the opposite side to said pin of said slider.

8. The optical matrix switch as claimed in claim 7, wherein the curvature radius of the optical fiber in the accommodating space is varied in accordance with movement of said slider.

9. The optical matrix switch as claimed in claim 8, wherein said first and second sliders are disposed so as to nip said first and second guide mechanisms respectively, and a ferrule of said first slider is optically connected to a ferrule of said second slider.

10. The optical matrix switch as claimed in claim 9, wherein each of said first and second guide mechanisms is movable upwardly and downwardly by a ball thread which is rotated by a DC servo motor.

11. An optical matrix switch comprising:
a guide mechanism having plural guide portions arranged in parallel;
a slider for holding an optical fiber, said slider being freely slidably mounted along a guide portion of said guide mechanism;
a partition member for isolating a surplus-length portion of the optical fiber along the guide portion of said guide mechanism, said optical fiber being connected to said slider; and
drive means for moving said slider along the guide portion of guide mechanism;
wherein said partition member comprises a plate member having a J-shaped section, said J-shaped section including a bent portion and a restriction portion for restricting the position of the surplus-length portion of the optical fiber.

12. The optical matrix switch as claimed in claim 11, wherein each of said guide portions has a guide groove at each of upper and lower portions thereof, and said slider has a pair of engaging portions, each of which is engageable with said guide groove.

13. The optical matrix switch as claimed in claim 12, wherein said partition member is disposed in such a manner that a concave portion of said bent portion thereof confronts said guide groove of said guide portion.

14. The optical matrix switch as claimed in claim 13, wherein said slider holds the optical fiber in a vertical direction to said guide groove, and said partition member is disposed such that said guide portion and said bent portion are spaced at an interval to prevent at least the optical fiber from being bent by such an amount that a curvature radius thereof is smaller than the minimum critical curvature radius thereof.

15. The optical matrix switch as claimed in claim 14, wherein an accommodating space is formed by said partition member and said guide portion, and the optical fiber is supported in the accommodating space in a loop having curvature radius above the minimum critical curvature radius.

16. The optical matrix switch as claimed in claim 15, wherein said slider has a pin projecting therefrom, and said drive means has a robot hand to which a split sleeve for holding said pin is fixed.

17. The optical matrix switch as claimed in claim 16, wherein a ferrule for holding the optical fiber projects at the side of said slider opposite said pin.

18. The optical matrix switch as claimed in claim 17, wherein the curvature radius of the optical fiber in the accommodating space varies in accordance with movement of said slider.

19. The optical matrix switch as claimed in claim 18, wherein said slider is disposed so as to nip said guide mechanism, and a ferrule of said slider is adapted to be optically connected to a ferrule of a slider holding a second optical fiber.

20. The optical matrix switch as claimed in claim 19, wherein said guide mechanism is movable upwardly and downwardly by a ball thread which is rotated by a DC servo motor.

* * * * *